(12) United States Patent
Zhang et al.

(10) Patent No.: US 7,408,944 B2
(45) Date of Patent: Aug. 5, 2008

(54) METHOD, SYSTEM, AND APPARATUS FOR A VIRTUAL HOST GATEWAY IN A MODEM DEVICE

(75) Inventors: Frank Nan Zhang, Sunnyvale, CA (US); Zhicheng Hou, Hebel Province (CN)

(73) Assignee: XECOM, Inc., Milpitas, CA (US)

( * ) Notice: Subject to any disclaimer, the term of this patent is extended or adjusted under 35 U.S.C. 154(b) by 502 days.

(21) Appl. No.: 11/045,933

(22) Filed: Jan. 28, 2005

(65) Prior Publication Data

US 2006/0209850 A1    Sep. 21, 2006

(51) Int. Cl.
*H04L 12/28* (2006.01)

(52) U.S. Cl. .................. 370/401; 370/338; 370/352; 455/557

(58) Field of Classification Search .......... None
See application file for complete search history.

(56) References Cited

U.S. PATENT DOCUMENTS

| | | | | |
|---|---|---|---|---|
| 5,452,291 | A | * | 9/1995 | Eisenhandler et al. ........ 370/402 |
| 5,787,363 | A | * | 7/1998 | Scott et al. .................. 455/557 |
| 6,097,733 | A | * | 8/2000 | Basu et al. .................. 370/468 |
| 6,131,136 | A | | 10/2000 | Liebenow et al. ............ 710/131 |
| 6,205,495 | B1 | | 3/2001 | Gilbert et al. ................... 710/8 |
| 6,751,474 | B1 | | 6/2004 | Lin et al. .................... 455/557 |
| 2004/0171348 | A1 | | 9/2004 | Lin et al. ....................... 455/39 |

* cited by examiner

*Primary Examiner*—Bob A Phunkulh
(74) *Attorney, Agent, or Firm*—Pillsbury Winthrop et al.

(57) ABSTRACT

A system, method, and apparatus for providing an embedded controller in a modem device for enabling data communication between different networks. Management and control capabilities for a gateway function are embedded into a communication controller of the modem device so as to enable direct connection between wired and wireless devices while eliminating a separate gateway controller. A single controller in the modem device, wired or wireless, manages its own designated communication functions and data exchange between the two different networks.

6 Claims, 7 Drawing Sheets

METHOD, SYSTEM, AND APPARATUS FOR A VIRTUAL HOST GATEWAY IN A MODEM DEVICE

FIELD OF INVENTION

The present invention relates in general to data communication, and more particularly to a system, method, and apparatus for bridging two networks for data communication.

BACKGROUND OF INVENTION

Modems are typically used as a means for inexpensive data communications. A modem is referred to herein as a device to connect two hosts through a data link. Modems typically convert signals produced by one type of device, e.g., a computer, to a form compatible with another device, e.g., a telephone. Many applications use modems connected to a telephone line accessible through a public switched telephone network (PSTN) to pass data to an application controller, typically a central management server. PSTN refers to the international public telephone system that carries analog voice and data signals. The term modem stands for mo(dulator)-dem(odulator) since a stream of digital data or binary bits (0's and 1's) is modulated for transmission into an analog signal within the bandwidth of the PSTN and the received analog signal is demodulated back to digital data.

Applications providing communication between different types of networks typically include a gateway device for bridging the networks. For example, one network may comprise a local wireless linked network having one or more wireless modems and the other network comprises a wired telephone line link network having one or more wired modems. FIG. 1 is a block diagram depicting an exemplary prior art system 10 for applications having wired modems and wireless modem devices for data communications. System 10 includes a microprocessor-based remote application micro-controller 12a for providing system control for a corresponding node 14a in system 10. An identical remote application micro-controller 12b is shown for a node 14b. The remote application micro-controllers 12a, 12b are also referred to herein as micro-controllers or "remote app" micro-controllers as shown in FIG. 1. System 10 includes a requesting application controller 30 which typically is a server that originates data requests to the rest of the system.

Each remote application micro-controller 12a, 12b typically includes a microprocessor, random access memory, non-volatile memory, and input and output signal interfaces (not shown). The remote application micro-controller 12a, 12b provide control based on an application program loaded therein through a loading means (not shown). The application program for each remote application micro-controller 12a, 12b is typically loaded as firmware stored in the non-volatile memory of the system, but is not limited to this form.

As shown in the system in FIG. 1, each micro-controller 12a, 12b interfaces with a corresponding wireless device 20a, 20b via a data interface bus which is typically a serial port 26a, 26b. Each wireless device 20a, 20b has a pre-determined protocol to enable communication with its corresponding remote application micro-controller 12a, 12b. The protocol may be a defined command set and syntax for every command, or through addressable register settings of each remote application micro-controller 12a, 12b. Each remote application micro-controller 12a, 12b can be programmed to provide management and control via a corresponding I/O interface with other devices or sensors (not shown).

When data communication is required which is event driven or pre-scheduled, the micro-controller 12a, 12b typically issues commands to its connected wireless device to initiate a communication session with another wireless device. For applications using a wireless device for data communication, the controller 12a, 12b executes its stored application program for managing all necessary functions and for preparing reports to be forwarded to the higher level requesting application controller 30.

The application controller 30 interfaces with a wired modem 28b via a data interface bus which is typically a serial port 26e, as seen in FIG. 1. The wired modem 28b is not limited to a modem; any suitable wired device may be used. As seen in FIG. 1, the wired modem 28b is coupled to nodes 14a and 14b for communication via gateway 2. Gateway 2 comprises a wireless modem 20c, a wired modem 28a, a wired to wireless gateway controller 24, and serial ports 26c, 26d. The wireless modems 20a, 20b communicate with a wireless modem 20c via a wireless link 16a, 16b using a corresponding antenna 22a, 22b, 22c. The gateway controller 24 connects to wireless modem 20c and wired modem 28a via corresponding serial ports 26c, 26d. The gateway controller 24 provides a bridge between the wireless modem 20c and the wired modem 28a. The wireless modem 20c communicates to the wired modem 28a which in turn communicates via the PSTN to another wired modem 28b.

The gateway controller 24 is typically implemented using a standalone processor for managing the two different data communication devices, i.e., the wireless modem and the wired modem. The standalone processor runs a program to manage the communication between the wired and wireless links. Gateway controller 24 enables data from a wireless linked device 20a, 20b to be passed to a remote application controller 30 through the telephone network, i.e., PSTN. Alternatively, gateway controller 24 enables data from telephone line linked equipment, i.e. wired modems 28a, 28b to be passed to the wireless networked devices 20a, 20b, 20c.

The standalone processor includes two serial ports for managing the two different serial ports linked devices. A program running in the processor in gateway controller 24 typically passes modem "AT" commands to the two devices for initializing the devices and to prepare each device to accept communication from either side. The modem "AT" command, also known as "the AT command set" for modems is a set of predefined commands initially developed by the Hayes Micro Computer Company in the mid 1980's to control their proprietary modem equipment used for connecting data terminals to host computing devices over the public telephone network. The AT command set is now the industry standard adopted by most modem manufacturers for controlling modems and serial data transmission over telephone lines. The AT command set has a string of characters for each command, preceded by the prefix "AT", for sending instructions to the modem. The original AT Command set has been augmented many times as modem speeds and feature sets have increased. Special commands have been added by many vendors to control new features of their wired and wireless communication products.

The gateway controller 24 enables the wired modem 28a and wireless modem 20c to exchange data through the gateway if both modems are enabled to connection through the gateway controller 24 to their counterpart modem. A drawback of the system shown in FIG. 1 is that a separate gateway controller is needed to provide bridging between the wired and wireless network devices.

A need exists to reduce cost and device size by eliminating the separate gateway controller for bridging of two communication networks. A system, method, and apparatus are therefore needed which solves the above described drawbacks of the prior art.

SUMMARY OF THE INVENTION

The present invention provides a method and corresponding system which overcomes the drawbacks of known systems and methods.

Broadly stated, the present invention provides a system for providing a virtual host for enabling data communication between different networks the system having an application controller and comprising a wired device in a wired network coupled to the application controller via a first bus; one or more wireless devices in a wireless network, each wireless device is coupled to a corresponding host controller via a corresponding bus, the wireless devices for communicating via a corresponding wireless link; a gateway module for enabling communication between the wired network and the wireless network comprising a wired modem for communicating with said wired device via said wired network; and a wireless module coupled to the wired modem via a serial port and comprising a wireless transceiver and communications controller; wherein the gateway module enables communication between each wireless device in the wireless network and the wired device in the wired network; such that the gateway module enables communication between the host controllers and the application controller.

Broadly stated, according to another embodiment, in a system having an application controller, a wired modem in a wired network coupled to the application controller via a first serial port, one or more wireless modems in a wireless network, each wireless modem is coupled to a corresponding host controller via a corresponding serial port, the wireless modems for communicating via a corresponding wireless link, a wired device for communicating with the wired modem via the wired network, a wireless module coupled to the wired device via a second serial port for enabling communication between the wired and the wireless network and between the host controllers and the application controller comprising a wireless transceiver; a user configurable communications controller; and programmable I/O pins connected to the second serial port; and wherein the wireless module provides for the switching of direction of its serial port signals for enabling connection to the wired modem.

Broadly stated, according to another embodiment, the present invention provides a method or enabling communication between the wired and the wireless network and between the host controllers and the application controller, in a system having an application controller, a wired device in a wired network coupled to the application controller via a first serial port, one or more wireless modems in a wireless network, each wireless modem is coupled to a corresponding host controller via a corresponding serial port, the wireless modems for communicating via a corresponding wireless link, a gateway module for enabling communication between the wired network and the wireless network having a wired modem for communicating with the wired device via a wired network link and a wireless module coupled to the wired modem via a second serial port and having a wireless transceiver and communications controller; comprising the steps of initializing the wireless module for preparing the gateway module to accept communication via the wireless link; managing communication for four operating modes of the gateway module, each mode representing a different connection state of the wired modem and the wireless module comprising managing communication for a first mode wherein the wired modem is not connected to the application controller and the wireless modem is not connected to one of the host controllers; managing communication for a second mode wherein the wired modem is connected to the application controller and the wireless module is not connected to one of the host controllers; managing communication for a third mode wherein the wireless modem is connected to one of the host controllers and the wired modem is not connected to the application controller; managing communication for a fourth mode wherein the wired modem is connected to one of the application controller and the wireless modem is connected to the host controller; selectively switching between the modes as a function of the connection state of the wired modem and the wireless module; responsive to a predetermined command transmitted from one of the wireless modems, selectively enabling the commanding wireless modem to communicate with the wired modem through the gateway module; and responsive to a predetermined command transmitted from the wired device, selectively enabling the wired device to communicate with the wireless module through the gateway module.

An advantage of the present invention is that it eliminates the need for a separate application microcontroller in a gateway application. In a preferred embodiment, the present invention enables direct connection of a wired modem to a wireless modem having a transceiver and a communications controller. The present invention enables management and control capabilities to be embedded into the communications controller of the wireless device so as to enable direct connection from the wireless device to the wired modem, eliminating the separate gateway controller. In other words, the present invention enables a single controller in the wireless device to manage wireless communication and modem operation so as to eliminate the gateway controller. As a result, equipment cost is reduced because there is no need for a separate gateway controller for bridging two networks.

These and other embodiments, features, aspects, and advantages of the invention will become better understood with regard to the following description, appended claims and accompanying drawings.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

Reference symbols or names are used in the Figures to indicate certain components, aspects or features shown therein, with reference symbols common to more than one Figure indicating like components, aspects or features shown therein.

DETAILED DESCRIPTION OF THE INVENTION

The present invention will now be described in more detail with reference to FIGS. 2-7. The term "wireless device" herein refers to a device for wireless data communication purposes that functions as the "carrier" for the system, method, and apparatus according to embodiments of the present invention.

Figure 1:
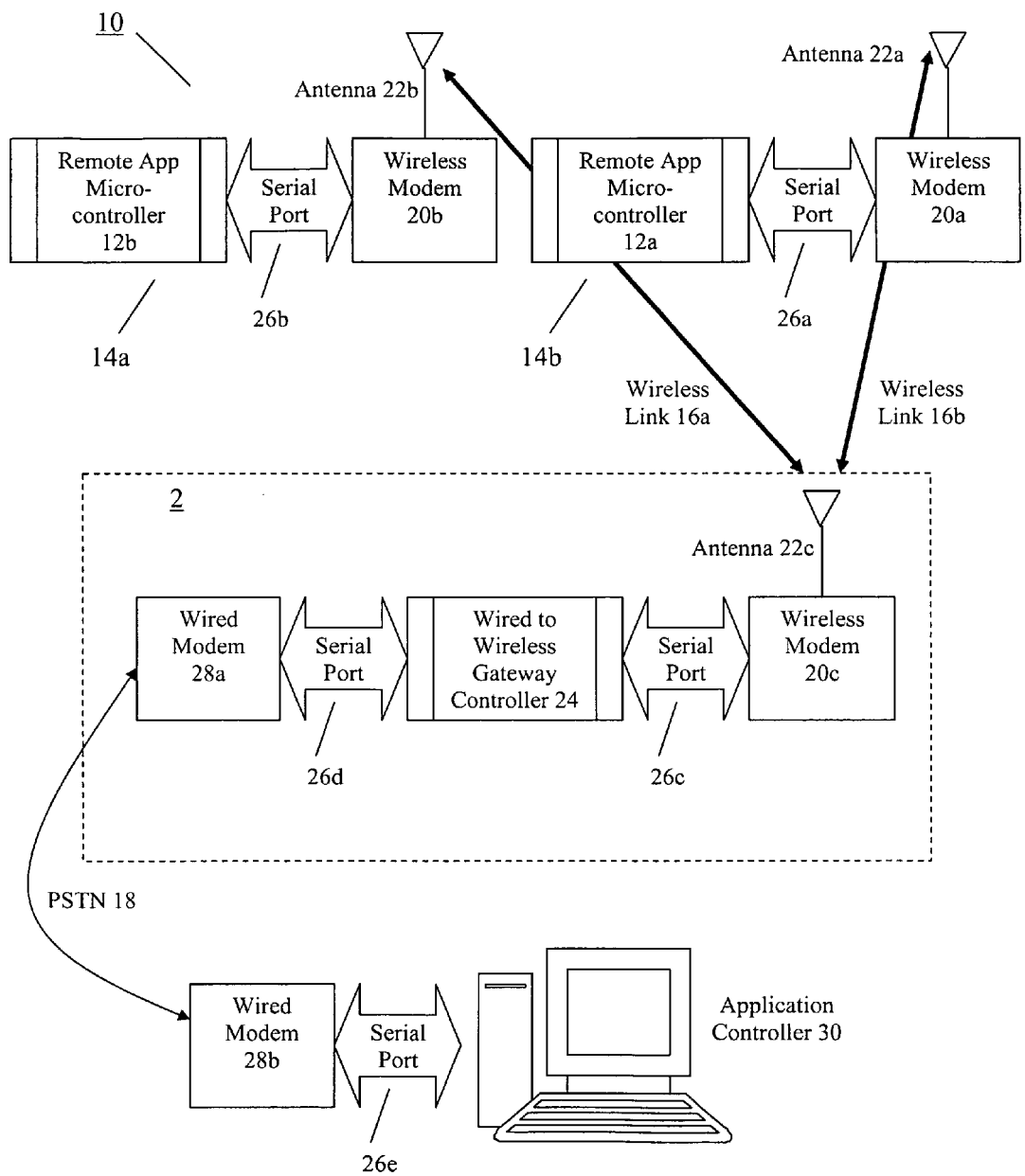
FIG. 1 is a block diagram depicting an exemplary prior art system 10 for applications using wired and wireless modem devices for data communications.
Figure 2:
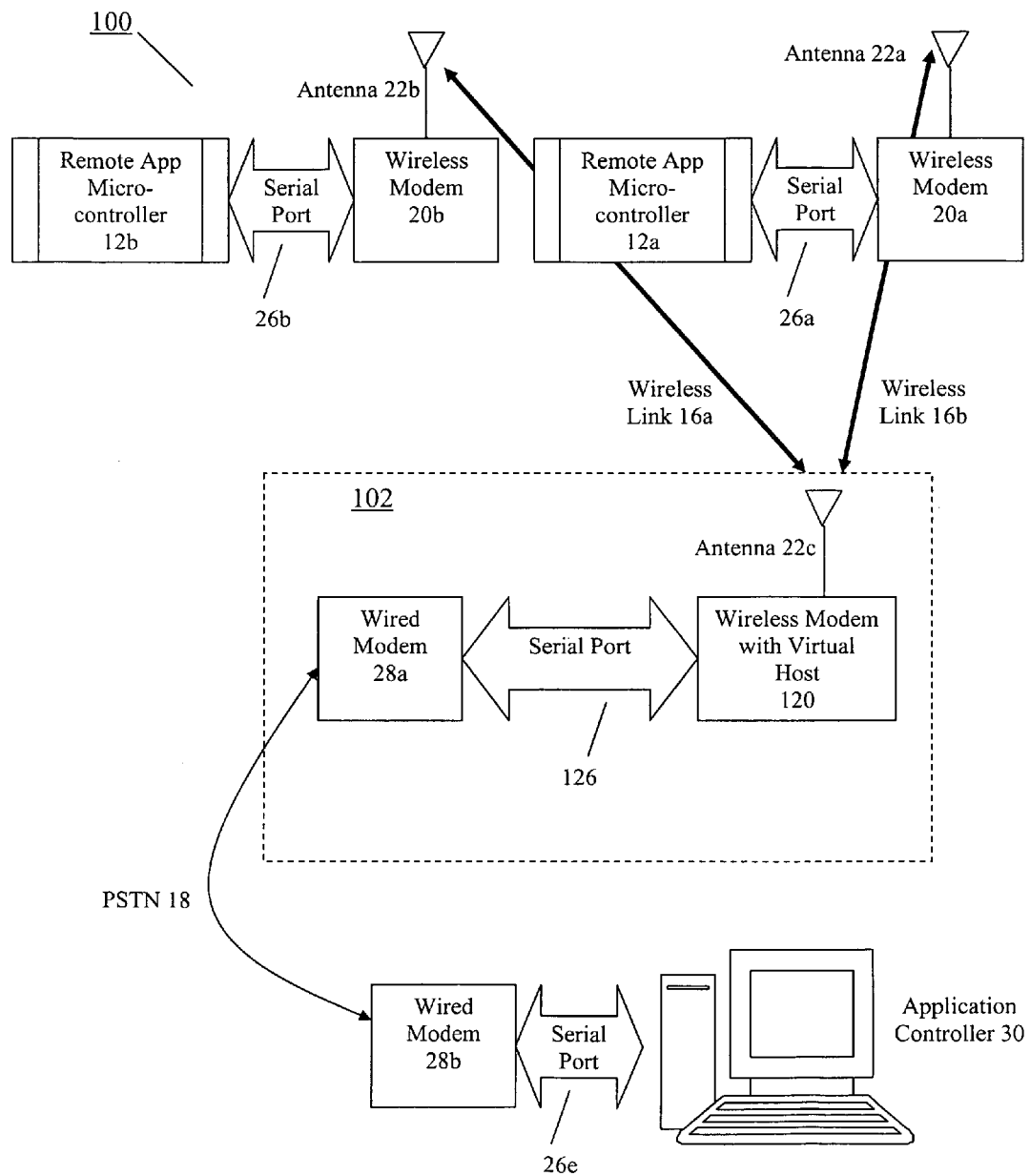
FIG. 2 is a block diagram depicting a system, method, and apparatus for a virtual host according to an embodiment of the present invention.

FIG. 2 is a block diagram depicting a system 100 and method for a virtual host according to an embodiment of the present invention. FIG. 2 also illustrates the data flow between the different devices in the system. System 100 in FIG. 2 includes the elements of system 10 of FIG. 1 except for gateway 102 replacing gateway 2. Gateway 102 includes comprises a "wireless modem with virtual host" 120 coupled to the wired modem 28a via a serial port 126. The "wireless modem with virtual host" 120, also referred to herein as wireless virtual host modem, wireless module, or virtual host, comprises wireless modem 20c plus the virtual host functionality. In an alternative embodiment (not shown) the virtual host functionality is implemented in the wired modem 28a instead of the wireless modem 20c.

Wireless virtual host modem 120 replaces the wireless modem 20c and the gateway controller 24. According to an embodiment of the present invention, devices coupled to either side of gateway 102, i.e., the PSTN 18 or the wireless links 16a, 16b, can send AT commands to a modem on either side of gateway 102. The present invention provides a pass-through function wherein a remote device, e.g., wireless modem 20a, can send AT commands to a modem on the other side of gateway 102, e.g., wired modem 28a. For this example, the system 100 enables a wireless networked device 20a to first make a call to the wireless virtual host modem 120 that provides the gateway and connect to it. The system then enables the remote wireless modem, e.g., 20a, 20b, to send AT commands to the wired modem 28a to control it. The remote wireless modem can control wired modem 28a to call wired modem 28b linked to the application controller 30 in order to make a connection to the application controller 30. According to this example, the pass-through function in wireless virtual host modem 120 enables a gateway connection for enabling a remote wireless modem, e.g., 20a, 20b, to communicate with the application controller 30. In this example, the gateway linked path for communication is via a linked path that includes gateway 102, wired modem 28b, and serial port 26e to application controller 30. More specifically, the path from wireless modem 20a, 20b includes the wireless link 16a, 16b to wireless virtual host modem 120, serial port 126, wired modem 287a, wired device 28b, serial port 26e, and application controller 30. Thus, wired devices connected to gateway 102 can communicate when both sides of gateway 102, i.e., wired modem 28a and wireless virtual host modem 120, are connected.

The initialization of the virtual host 120 prepares the gateway 102 to accept remote calls via a wireless link. An AT command ATS0=1 sent to a modem in gateway 102 will direct it to connect automatically when it receives a call.

The pass-through function is implemented in the firmware in the wireless virtual host modem 120. The pass-through function according to the present invention enables a connected remote host to gain control of a modem on one side of the gateway 102 by calling the other side of the gateway 102, i.e., either the wired modem 28a or wireless virtual host modem 120, from a remote counterpart host and making the connection. For example, the present invention enables a micro-controller 12a to send AT commands to the wired modem 28a of the gateway 102 for controlling modem 28a if the wireless virtual host modem 120 of the gateway 102 has connected with the micro-controller 12a. The present invention enables two host controllers in two different networks, e.g., application controller 30 and micro-controller 12a in FIG. 1, to exchange data through the gateway transparently if wired modem 28a and wireless virtual host modem 120 of the gateway 102 are connected with the corresponding host controller, i.e., application controller 30 and micro-controller 12a.

A modem device typically has a serial port to communicate with a host computer or host controller. Devices which use serial ports for their communication are split into two equipment categories. The modem has been defined as a Data Communication Equipment (DCE) and the host computer or host controller is defined as a Data Terminal Equipment (DTE). In a standard serial port, signals are defined either ways. Table 1 shows a description and designation for an RS-232 standard serial port signal set having 9 signals/pins.

TABLE 1

| # | Signal | Description | DTE | DCE |
|---|--------|-------------|-----|-----|
| 1 | DCD | Data Carrier Detect | Input | Output |
| 2 | RXD | Receive Data | Input | Output |
| 3 | TXD | Transmit Data | Output | Input |
| 4 | DTR | DTE Ready | Output | Input |
| 5 | GND | Ground | N/A | N/A |
| 6 | DSR(DCR) | DCE Ready | Input | Output |
| 7 | RTS | DTE enable DCE to send | Output | Input |
| 8 | CTS | DCE enable DTE to send | Input | Output |
| 9 | RI | Ring Indicator | Input | Output |

A modem is typically a Data Communication Equipment ("DCE") device. The serial port signals for the wireless virtual host modem 120, however, must be changeable so that the modem functions like a DTE device since for communication for the virtual host function the wireless virtual host modem 120 is connected directly to the wired modem 28a via serial port 126, rather than being connected to wired modem 28a through the gateway controller 24. According to this connection for the virtual host function, the wireless virtual host modem 120 functions as a DTE and the wired modem 28a as a DCE. For example, for the pass-through function, a remote calling party will see "through" the wired link and see the AT command interface of the wireless virtual host modem 120 if the remote calling party calls wired modem 28a and gets connected thereto. Thus, the pass-through function of the present invention enables wired modem 28a to control the wireless virtual host modem 120 in order to connect to another wireless modem device, e.g., wireless modem 20a.

The wireless virtual host modem 120 must provides for switching its serial port signal direction from its DCE status to DTE status to enable connection to another wired modem device (DCE). According to the present invention, wireless virtual host modem 120 is software configurable and includes programmable I/O pins for providing the switching. For enabling the virtual host function of wireless virtual host modem 120, all of its serial port signals reverse directions so as to change the serial port signals, i.e., in Table 1, of wireless virtual host modem 120 from DCE to DTE without changing the signal names.

The main virtual host functions of wireless virtual host modem 120, other than serial port signal management and control, are provided through software as will be described in further detail below. The virtual host function of wireless virtual host modem 120 is provided through control of its initialization to configure its serial port as DTE's along with management and controls of four operational modes.

Figure 3:
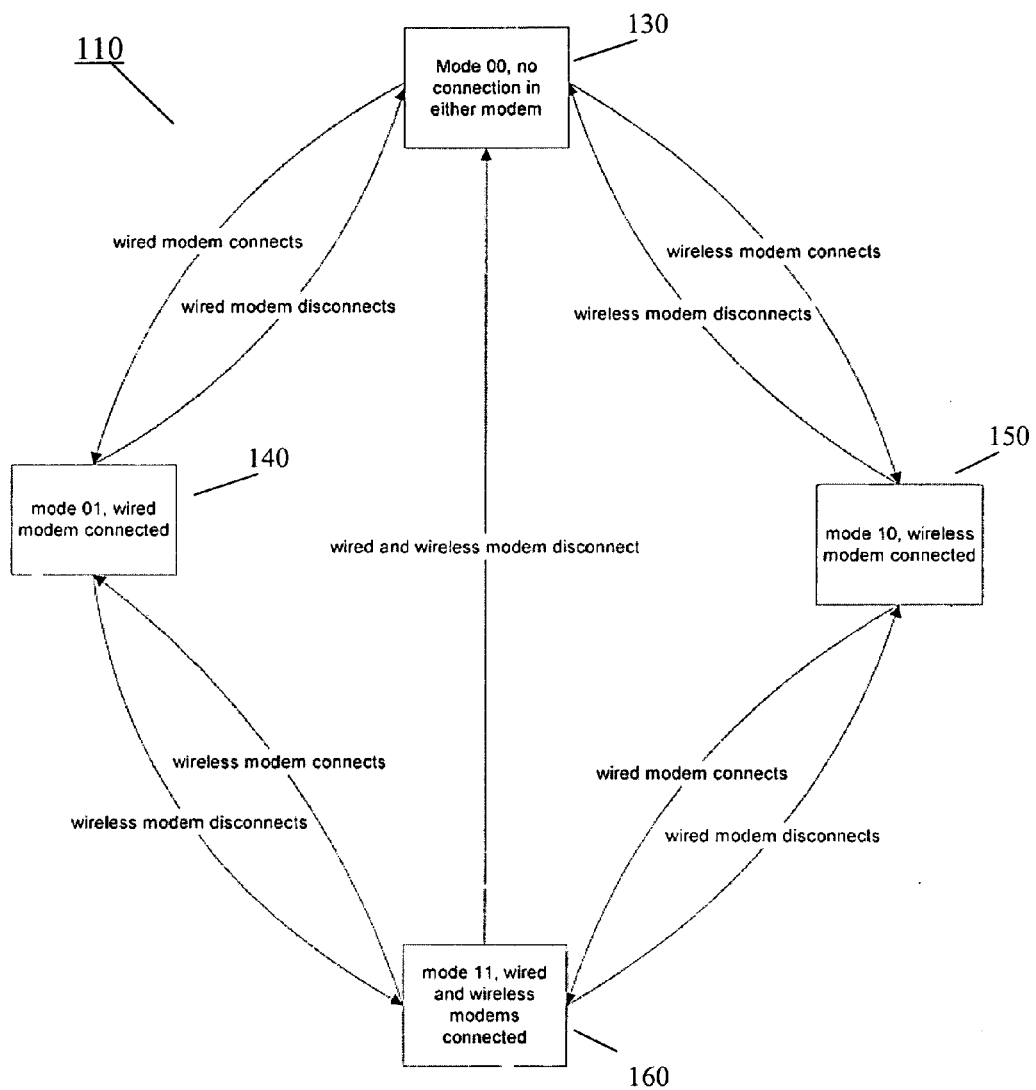
FIG. 3 is a flow diagram 110 illustrating modes and the flow between modes according to the system, method, and apparatus in FIG. 2.

The four operational modes of the wireless virtual host modem 120 according to the embodiment of system, method, and apparatus of the present invention shown in FIG. 2 are shown in more detail in FIGS. 3-7. FIG. 3 is a flow diagram 110 illustrating modes and the flow between modes according to the system, method, and apparatus in FIG. 2. According to Mode 00 "standby" at node 130, neither modem on either side of gateway 102 is connected. According to Mode 01 at node 140, only the wired modem 28a side of gateway 102 is connected. According to Mode 10 at node 150, only the wireless virtual host modem 120 side of gateway 102 is connected. According to Mode 11 at node 160, both the wired modem 28a and wireless virtual host modem 120 are connected.

Figure 4:
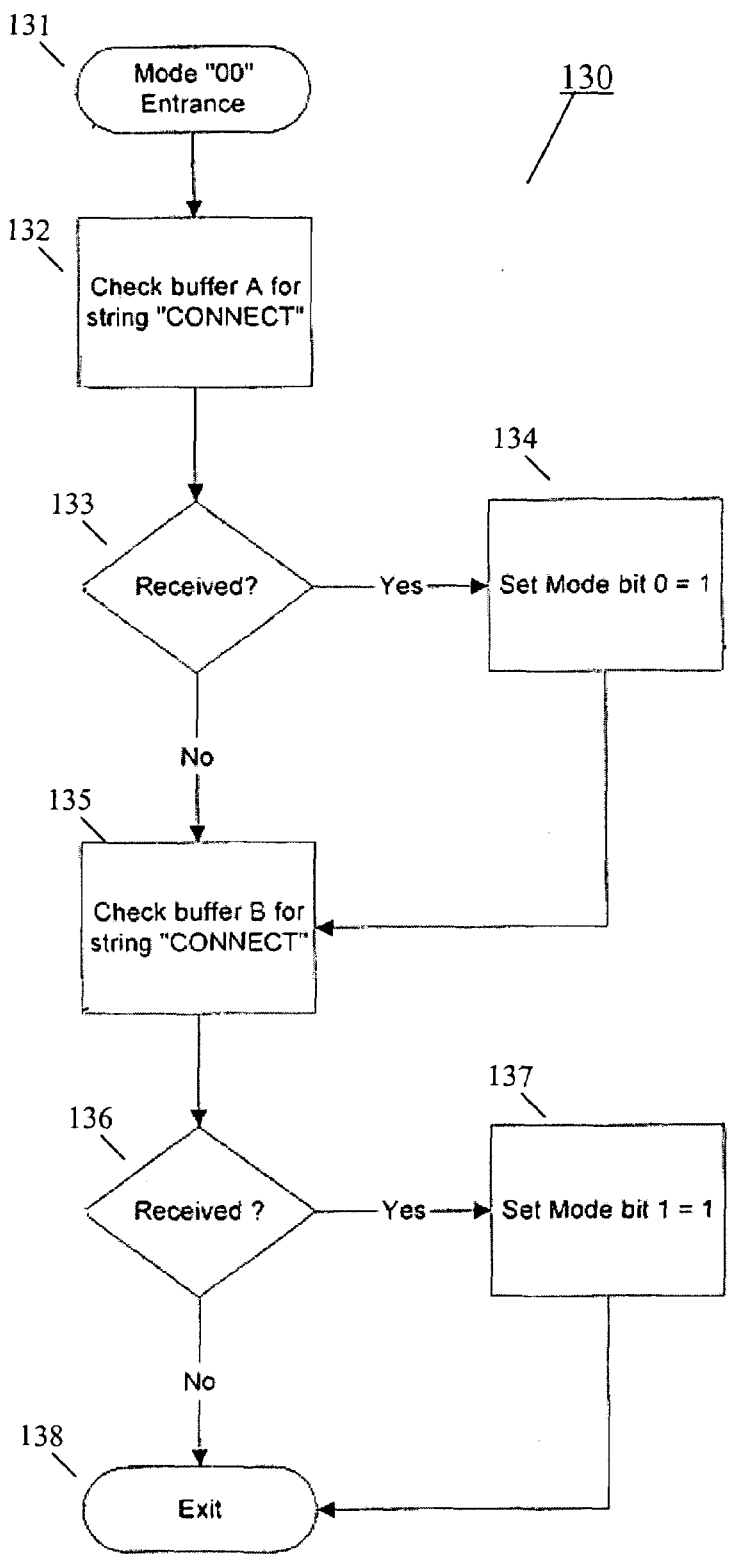
FIGS. 4-7 are flow charts illustrating details regarding one of the operating modes in FIG. 3 according to an embodiment of the present invention.

FIGS. 4-7 are flow charts illustrating details regarding one of the operating modes in FIG. 3 according to an embodiment of the present invention. FIG. 4 illustrates the flow 130 for the process according to Mode 00 in FIG. 3. The gateway 102 is in idle state in Mode 00 such that the gateway 102 is not connected to any of wired or wireless counterpart host controller, i.e., 30, 12a, 12b. In Step 131, the Mode 00 process is entered. The mode designation comprises two bits having mode bit 0 as the least significant bit (LSB) on the right and mode bit 1 as the most significant bit (MSB) on the left. In Step 132, the software checks a buffer A to determine if a "CONNECT" command is input to the wired modem side. In Step 133, a determination is made as to whether a CONNECT string has been received on the wired modem side. In Step 134, the LSB of the mode is set to 1 if buffer A indicates that a CONNECT string has been received on the wired modem side, that is, the mode bits change to Mode 01, and the process proceeds to Step 135. The process also proceeds to Step 135 if buffer A indicates that a CONNECT string has not been received on the wired modem side. In Step 135, the software checks a buffer B to determine if a "CONNECT" string is input to the wireless virtual host modem 120 side of gateway 102. In Step 136, a determination is made as to whether a CONNECT string has been received on the wireless modem side. In Step 137, the MSB of the mode is set to 1 if buffer B indicates that a CONNECT string has been received on the wireless modem side and the process proceeds to Step 138. The process also proceeds to Step 138 if buffer B indicates that a CONNECT string has not been received on the wireless modem side.

Figure 5:
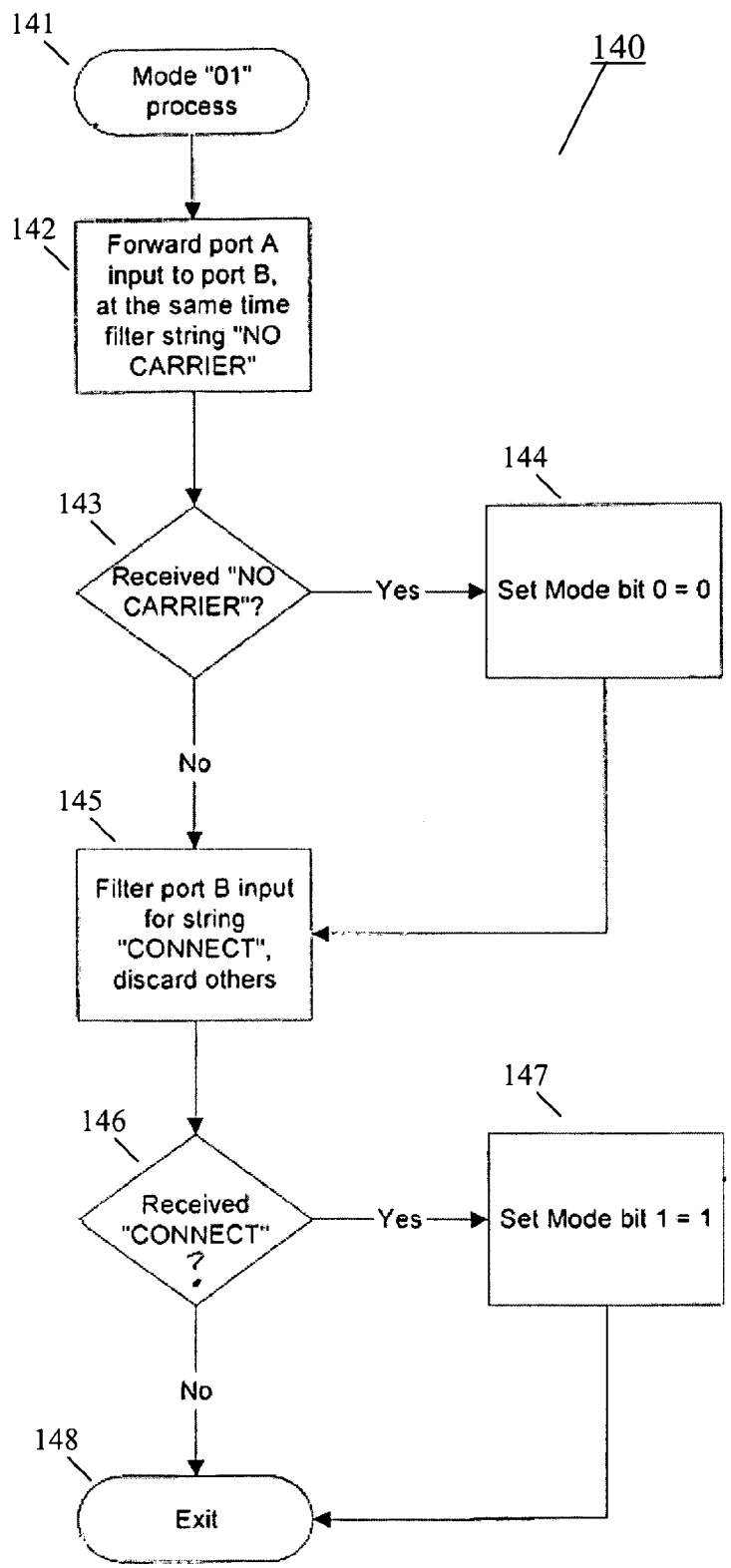

FIG. 5 illustrates the flow 140 for the process according to Mode 01 in FIG. 3. In Mode 01, the wired modem is connected to a remote host counterpart, i.e., application controller 30 via wired device 28b, but the wireless virtual host modem 120 is not connected to a remote counterpart, i.e., wireless links 16a, 16b, in Mode 01. In Mode 01, the pass-through function according to the present invention enables the remote host to be in control of the AT command interface of the wireless virtual host modem 120. According to Mode 01, all input from the remote host will be forwarded to an AT command handler of the wireless virtual host modem 120 for execution as an AT command for operating the wireless virtual host modem 120. In Mode 01, for example, the remote host may change certain settings of wireless virtual host modem 120, attempt to initiate a connection, i.e., changing modes, to another wireless modem, e.g., 20a, or attempt a count-off command to collect information from multiple wireless modems within working distance. The count-off command is described in copending commonly assigned U.S. patent application Ser. No. 10/830,750, which is incorporated herein by reference. In Mode 01, although the remote host can "attempt" to initiate a connection to wireless modem 20a, for example, it should be appreciated that since the wireless virtual host modem 120 is not connected to wireless modem 20a in Mode 01, a change in modes is required such that wireless virtual host modem 120 connects to wireless modem 20a before the "attempt" can be successful.

Turning to further details of the specific process steps for the process 140 for Mode 01 shown in FIG. 5, in Step 141, the Mode 01 process is entered. In Step 142, the port A input, i.e., on the wired modem side is forwarded to port B, i.e., on the wireless virtual host modem 120 side, while filtering the input in order to detect a "NO CARRIER" string for checking the connection state of the wired modem. In Step 143, a determination is made as to whether a "NO CARRIER" string has been received, indicating that the wired modem has been disconnected. In Step 144, the LSB of the mode is set to 0 if the "NO CARRIER" string has been received so as to cause the mode to change to Mode 00 and the process proceeds to Step 145. The process also proceeds to Step 145 if a determination is made that a "NO CARRIER" string has not been received, i.e., remain at Mode 01. In Step 145, the port B input is filtered for detection of a "CONNECT" string, indicating the wireless virtual host modem 120 is connected, while discarding other strings. In Step 146, a determination is made as to whether a CONNECT string has been received on the wireless modem side. In Step 147, the MSB of the mode is set to 1 if the CONNECT string has been received on the wireless modem side and the process proceeds to Step 148. The process also proceeds to Step 148 if a CONNECT string has not been received on the wireless modem side.

Figure 6:
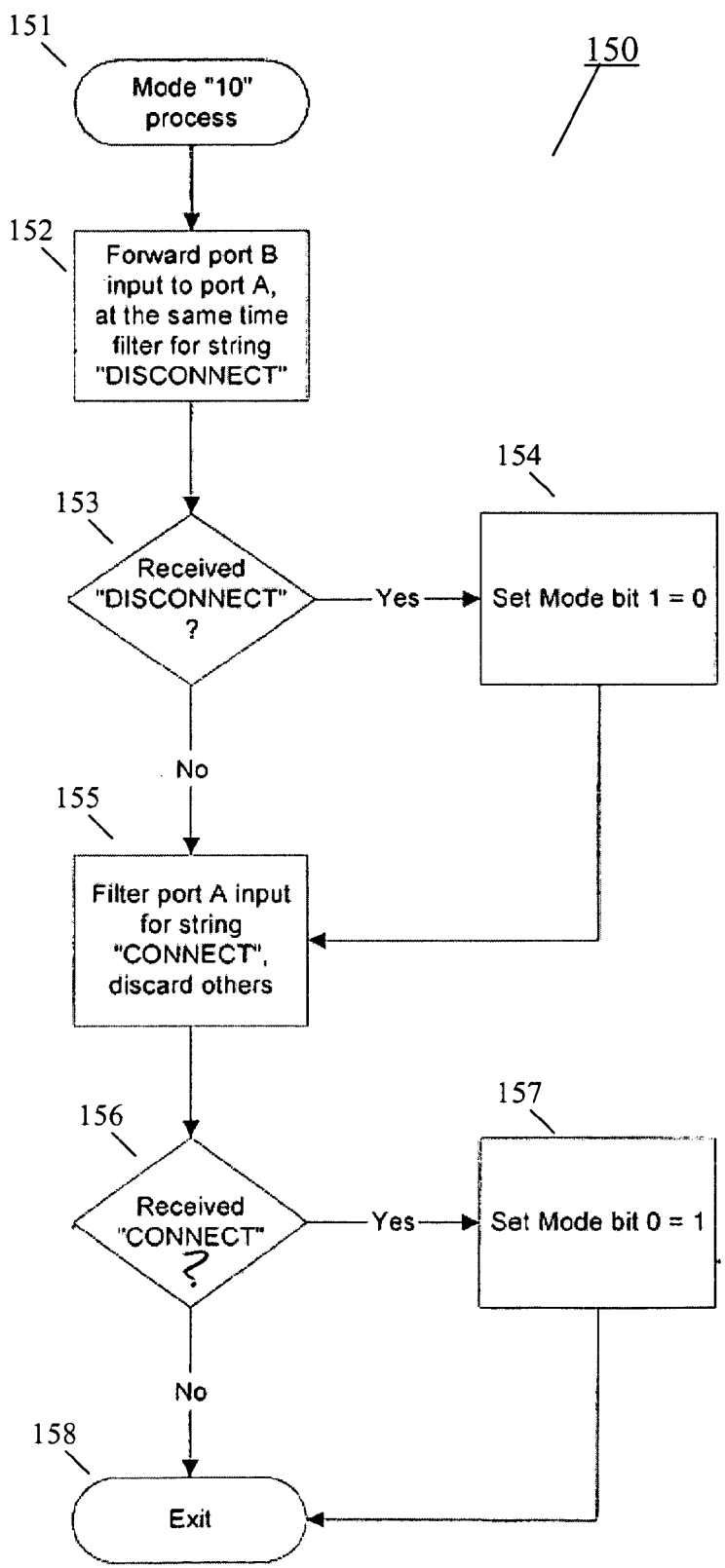

FIG. 6 illustrates the flow 150 for the process according to Mode 10 in FIG. 3. In Mode 10, the wireless virtual host modem 120 is connected to another wireless counterpart, e.g., 20a. In Mode 10, the wireless modem linked device, e.g., 20a is in control of the AT command interface of the wired modem 28a in gateway 102 through use of the pass-through function. According to the pass-through function, all input from a host, i.e., 12a, linked via wireless link 16b through wireless modem 20a to gateway 102 is forwarded to the serial port of wired modem 28a for execution as an AT command for operating the wired modem 28a. Thus, in Mode 10, a wireless modem linked host, e.g., 12a, may change the settings of the wired modem 28a remotely, or attempt to initiate a connection with another remote server, i.e., 30, through the PSTN system.

Turning to further details of the specific process steps for the process 150 for Mode 10 shown in FIG. 6, in Step 151, the Mode 10 process is entered. In Step 152, the port B input, i.e., on the wireless virtual host modem 120 side, is forwarded to port A, i.e., on the wired modem side, while filtering the input in order to detect a "DISCONNECT" string for checking the connection state of the wireless virtual host modem 120. In Step 153, a determination is made as to whether a "DISCONNECT" string has been received, indicating that the wireless virtual host modem 120 has been disconnected. In Step 154, the MSB of the mode is set to 0 if the "DISCONNECT" string has been received so as to cause the mode to change to Mode 00 and the process proceeds to Step 155. The process also proceeds to Step 155 if a determination is made that a "DISCONNECT" string has not been received, i.e., remain at Mode 10. In Step 155, the port A input is filtered for detection of a "CONNECT" string, indicating the wired virtual 28a is connected, while discarding other strings. In Step 156, a determination is made as to whether a CONNECT string has been received on the wired modem side. In Step 157, the LSB of the mode is set to 1 if the CONNECT string has been received on the wired modem side and the process proceeds to Step 158. The process also proceeds to Step 158 if a CONNECT string has not been received on the wired modem side.

Figure 7:
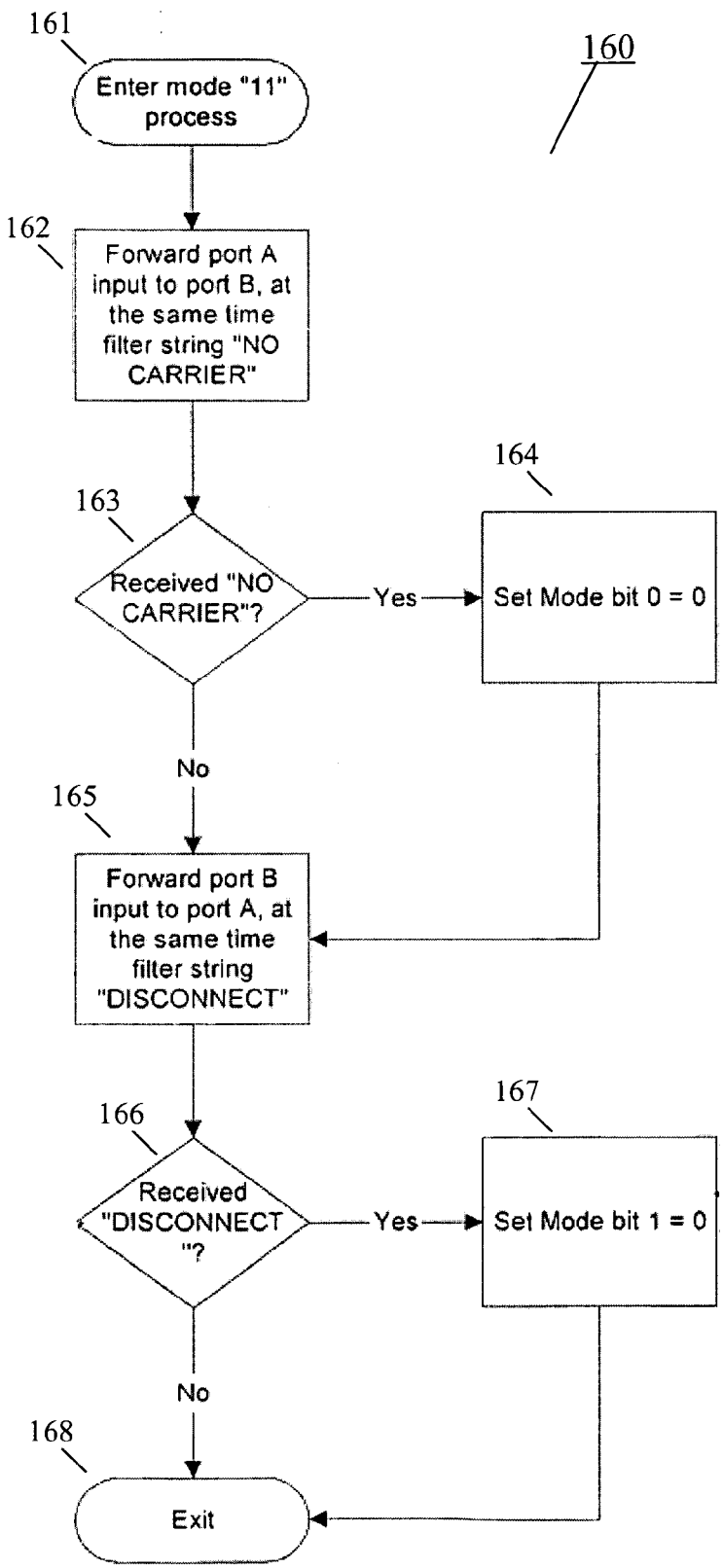

FIG. 7 illustrates the flow 160 for the process according to Mode 11 in FIG. 3. In mode 11, all data coming in to one side of the gateway 102 is sent from the other side. For example, if a data byte into gateway 102 comes from the connected telephone line modem 28b, the data byte will be passed through the wireless virtual host modem 120 in gateway 102 and sent to wireless modems 20a or 20b connected to wireless virtual host modem 120 via wireless links 16a, 16b.

Turning to further details of the specific process steps for the process 160 for Mode 11 shown in FIG. 7, in Step 161, the Mode 11 process is entered. In Step 162, the port A input, i.e., on the wired modem side is forwarded to port B, i.e., on the wireless virtual host modem 120 side, while filtering the input in order to detect a "NO CARRIER" string for checking the connection state of the wired modem. In Step 163, a determination is made as to whether a "NO CARRIER" string has been received, indicating that the wired modem has disconnected. In Step 164, the LSB of the mode is set to 0 if the "NO CARRIER" string has been received so as to cause the mode to change to Mode 10 and the process proceeds to Step 165. The process also proceeds to Step 165 if a determination is made that a "NO CARRIER" string has not been received, i.e., remain at Mode 11. In Step 165, the port B input, i.e., on the wireless virtual host modem 120 side is forwarded to port A, i.e., on the wired modem 28a side, while filtering the input in order to detect a "DISCONNECT" string for checking the connection state of the wireless virtual host modem 120. In Step 166, a determination is made as to whether a DISCONNECT string has been received on the wireless modem side. In Step 167, the MSB of the mode is set to 0 if the DISCONNECT string has been received on the wireless modem side and the process proceeds to Step 168. The process also proceeds to Step 168 if a DISCONNECT string has not been received on the wireless modem side. In Mode 11, if one of the connections drops off due to environmental, noise, reasons, etc., the other connection is dropped within a predetermined time interval (not shown).

According to an embodiment of the present invention, when filtering for the "DISCONNECT" or "NO CARRIER" string from the serial port input, the system, apparatus, and method includes detection of hardware signals, e.g., the DCD signal in Table 1, for determining if the connection has been lost.

Having disclosed exemplary embodiments, modifications and variations may be made to the disclosed embodiments while remaining within the scope of the invention as described by the following claims.

What is claimed is:

1. In a system having an application controller, a wired device in a wired network coupled to said application controller via a first serial port, one or more wireless modems in a wireless network, each wireless modem is coupled to a corresponding host controller via a corresponding serial port, said wireless modems for communicating via a corresponding wireless link, a gateway module for enabling communication between said wired network and said wireless network having a wired modem for communicating with said wired device via a wired network link and a wireless module coupled to said wired modem via a second serial port and having a wireless transceiver and communications controller; a method for enabling communication between said wired and said wireless network and between said host controllers and said application controller comprising the steps of:

initializing said wireless module for preparing said gateway module to accept communication via said wireless link;

managing communication for four operating modes of said gateway module, each mode representing a different connection state of said wired modem and said wireless module comprising:

managing communication for a first mode wherein said wired modem is not connected to said application controller and said wireless modem is not connected to one of said host controllers;

managing communication for a second mode wherein said wired modem is connected to said application controller and said wireless module is not connected to one of said host controllers;

managing communication for a third mode wherein said wireless modem is connected to one of said host controllers and said wired modem is not connected to said application controller;

managing communication for a fourth mode wherein said wired modem is connected to one of said application controller and said wireless modem is connected to said host controller;

selectively switching between said modes as a function of the connection state of said wired modem and said wireless module;

responsive to a predetermined command transmitted from one of said wireless modems, selectively enabling said commanding wireless modem to communicate with said wired modem through said gateway module; and responsive to a predetermined command transmitted from said wired device, selectively enabling said wired device to communicate with said wireless module through said gateway module.

2. The method of claim 1, wherein selectively enabling steps include programming I/O signals of said wireless module connected to said second serial port to be selectively configured for connection to said second serial port as a function of said predetermined command.

3. The method of claim 1, wherein the communication between said wireless modem and said wired modem and between said wired device and said wireless module comprises data and commands.

4. The method of claim 1, wherein for the step of enabling said wireless modems to send commands to said wired modem, said commands from said wireless modems traverse a path comprising said wireless link, said wireless module, and said second serial port.

5. The method of claim 1, wherein for the step of enabling said wired device to send commands to said wireless module through said gateway module, said commands from said wired device traverse a path comprising through a path comprising said wired network link, said wired modem, and said second serial port.

6. The method of claim 1, wherein said wired network link is the public system telephone network (PSTN).

* * * * *